United States Patent [19]
Gallusser et al.

[11] Patent Number: 5,528,088
[45] Date of Patent: Jun. 18, 1996

[54] CURRENT MODE COUPLER WITH IMPROVED GROUNDING

[75] Inventors: David O. Gallusser, Oneonta; James B. LeBaron, Sidney, both of N.Y.

[73] Assignee: Amphenol Corporation, Wallingford, Conn.

[21] Appl. No.: 265,772

[22] Filed: Jun. 27, 1994

[51] Int. Cl.⁶ ............................... H04B 3/28; H05K 9/00
[52] U.S. Cl. ................... 307/104.000; 174/35 R; 307/91; 361/816; 439/610
[58] Field of Search ............... 307/104, 91; 336/DIG. 2; 174/35 R, 35 GC, 51, 78; 439/607, 609, 610; 361/800, 816–818

[56] References Cited

U.S. PATENT DOCUMENTS

| | | | |
|---|---|---|---|
| 4,337,989 | 7/1982 | Asick et al. | 439/609 |
| 5,128,835 | 7/1992 | Rudy, Jr. et al. | 361/818 |
| 5,158,481 | 10/1992 | Frantz | 439/607 |
| 5,241,219 | 8/1993 | LeBaron et al. | 307/104 |
| 5,354,951 | 10/1994 | Lange, Sr. et al. | 361/818 |

FOREIGN PATENT DOCUMENTS 3-109825  5/1991  Japan .

*Primary Examiner*—William M. Shoop, Jr.
*Assistant Examiner*—Richard T. Elms
*Attorney, Agent, or Firm*—Bacon & Thomas

[57] ABSTRACT

A current mode coupler for an unshielded twisted-pair cable includes an arrangement for establishing a low impedance, multiple point-of-contact electrical connection between a shielding base and cover. The grounding arrangement includes a conductive member on the cover which has an extension in the direction of assembly of the base to the cover, and resilient grounding fingers on the base for providing a wiping contact with the extensions on the conductive member when the base and cover are assembled to each other.

4 Claims, 1 Drawing Sheet

5,528,088

CURRENT MODE COUPLER WITH IMPROVED GROUNDING

BACKGROUND OF THE INVENTION

1. Field of the Invention

This invention relates to the field of electrical connectors, and in particular to a current-mode coupler capable of non-invasively transferring electronic data signals to and from a twisted pair cable.

2. Description Of Related Art

Current-mode couplers are electrical connectors which enable sensing and transmission of low-level signal currents through an electrical conductor without an electrical connection to the conductor, thereby eliminating the need for direct wiring into the bus cable.

The present invention is an improvement on the current-mode coupler disclosed in U.S. Pat. No. 5,241,219, assigned to Amphenol Corporation, in which coupling to a twisted pair data bus cable is carried out by mating pairs of E-shaped electromagnets which surround the wires when the coupler is assembled to the data bus in order to establish an inductive coupling between the data bus and windings on the magnet cores, the windings being electrically connected to a control unit for sensing signals being transmitted along the data bus, and also for transmitting signals to the data bus.

The coupler assembly of U.S. Pat. No. 5,241,219 includes separate upper and lower metallic casing halves for housing the respective E-shaped magnetic cores. The cores are position relative to the data bus when the casing halves are latched together by means of a hook and slot arrangement at one end and a quarter turn latch at the other. Because of the unique design of the casing halves disclosed in U.S. Pat. No. 5,241,219, the assembly procedure can be carried out in extremely narrow spaces, while nevertheless permitting an exceptionally stable coupling.

Despite the numerous advantages of the current-mode coupler described in U.S. Pat. No. 5,241,219, the prior coupler design does have the disadvantage of less than optimal shielding resulting from the fact that the seam between the upper and lower casing, unless machined to a tolerance greater than is presently practical, incorporates relatively few points of electrical contact, and the points of contact are primarily butting rather than wiping points of contact, resulting in a relatively high impedance electrical connection between the conductive casing halves and an inadequate grounding of the casing half which is not otherwise secured to the structure on which the current-mode coupler is attached, for example a bulkhead in an aircraft.

SUMMARY OF THE INVENTION

It is accordingly an objective of the invention to provide a current-mode coupler of the type having separate conductive casing halves, each of which houses a transformer core for establishing a non-invasive electrical coupling between a twisted pair of wires and windings on the transformer cores when the casing halves are assembled together, and which further includes structure for providing an improved electrical connection between the two halves of the casing.

It is also an objective of the invention to provide a current-mode coupler which possesses all of the advantages of the coupler described in U.S. U.S. Pat. No. 5,241,219, but which includes structure providing an improved electrical connection between the casing halves in which the transformer cores are housed.

These objectives are accomplished by providing, in accordance with the principles of a preferred embodiment of the invention, a current-mode coupler of the type intended to be used with a closed loop twisted pair data bus cable, the wires of the cable being held in position relative to two pairs of E-cores forming a core structure for inductively transferring data signals to and from a printed circuit signal winding, wherein:

- shielding is provided by two conductive casing halves which enclose the entire coupler, including an E-core structure, windings, and associated circuitry, when the casing halves are assembled to each other;
- assembly of the upper casing half of the coupler to the lower or base casing half is achieved by snapping or inserting an integral latching member provided at one end of either the upper or lower half of the coupler into a slot or recess provided in the corresponding other half of the coupler, the latching member being resilient to permit the upper half to be fitted onto the lower half in a single motion directed transversely to the plane of the panel onto which the coupler is to be mounted, and by turning a quarter turn latch provided at the end of the assembled casing halves which is opposite the end provided with the latching member and slot combination; and
- a low impedance connection between the upper and lower casing halves is established by including in the upper casing half a conductive surface which extends downwardly and, in the lower casing half, a plurality of internal EMI fingers for establishing a wiping contact between the upper and lower case halves upon assembly of the upper case half to the lower case half.

Further features and advantages of the invention will become apparent from the following description of a preferred embodiment of the invention, and from the drawing figures referenced in the description. Those skilled in the art will appreciate, however, that the description of the preferred embodiment is not to be taken as limiting, and that the numerous variations and modifications of the preferred embodiment which will undoubtedly occur to those skilled in the art are all intended to be included within the scope of the invention except as limited by the appended claims.

DETAILED DESCRIPTION OF THE PREFERRED EMBODIMENT

The preferred embodiment of the invention is based on the current-mode coupler disclosed in detail in U.S. Pat. No. 5,241,219, incorporated herein by reference. Because a number of the features disclosed in the prior patent are not relevant to the present invention, details thereof have been omitted from the drawings. However, the drawings do include all details necessary to an understanding of the invention, as well as details of changes in the design of the current-mode coupler described in the Patent.

Figure 1:
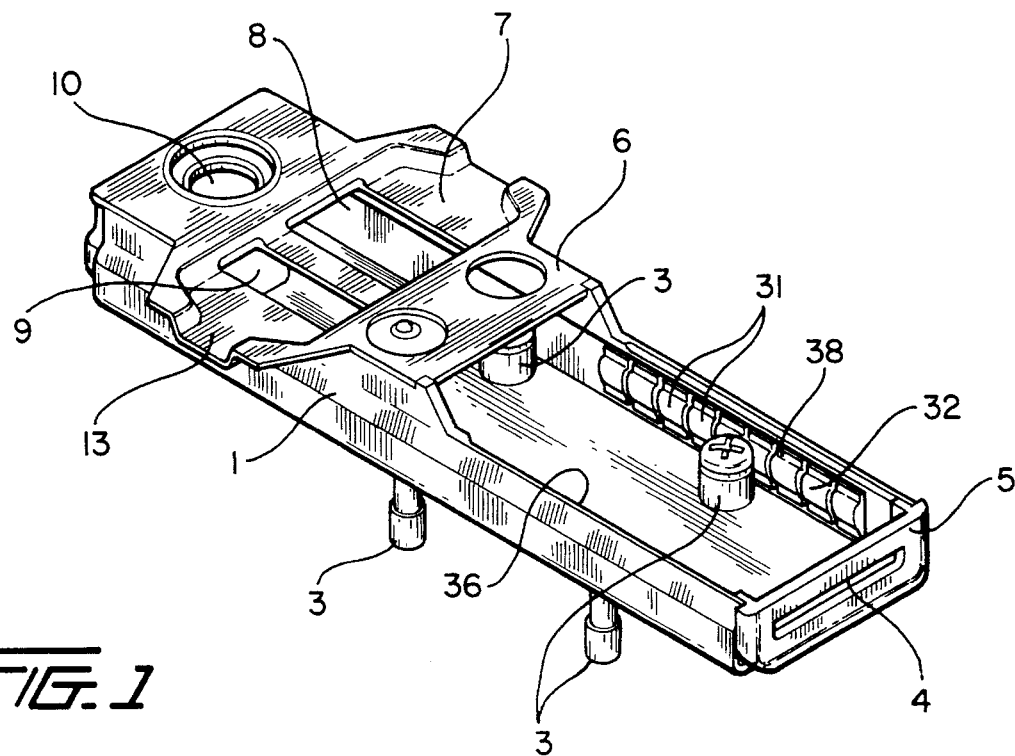
FIG. 1 is a perspective view of a preferred embodiment of a base portion for the current-mode coupler of the invention.
Figure 2:
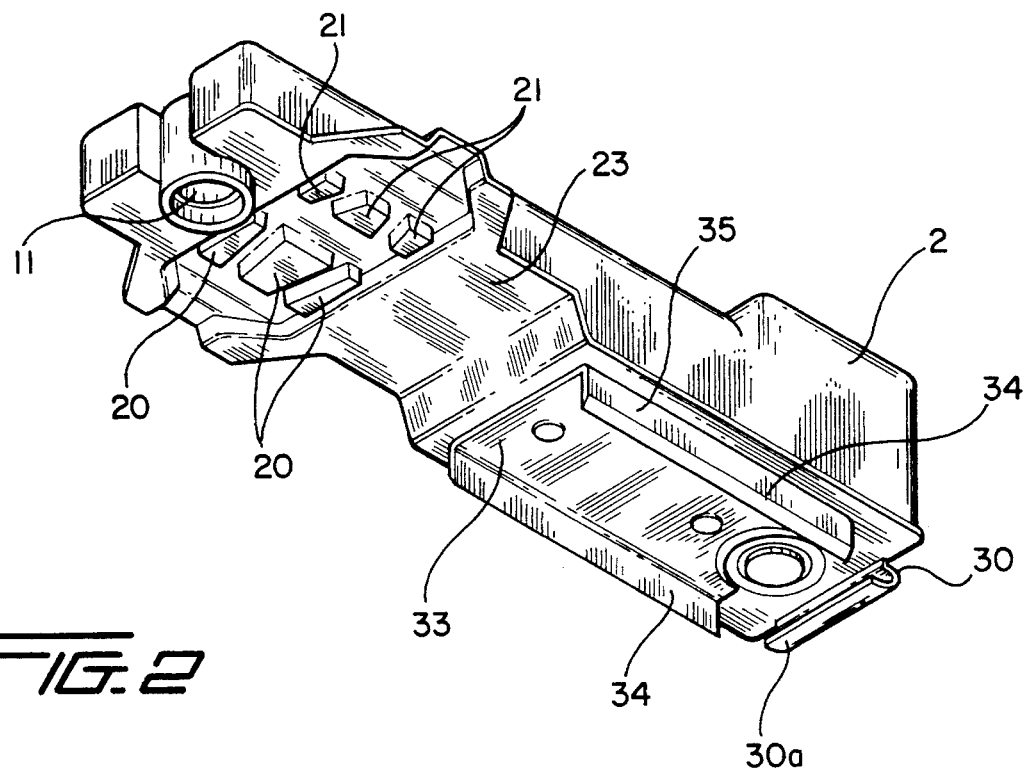
FIG. 2 is a perspective view of the cover of an upper shield housing for the current mode coupler of FIG. 1.

As illustrated in FIGS. 1 and 2, the current mode coupler constructed in accordance with the principles of a preferred embodiment of the invention includes a shield housing made up of a lower casing member or base 1 and an upper casing member or cover 2. Base 1 is essentially the same as the corresponding lower housing member of the coupler described in U.S. Pat. No. 5,241,219, except that the quick-release mounting described in the patent has been replaced by screws in captivating standoffs 3 for facilitating mounting of the base to a bulkhead or panel (not shown), and the latching slot 4 is provided in a discrete member 5 at the end of base 1 rather than integrally with the base. Like the coupler described in U.S. Pat. No. 5,241,219, the coupler of the presently preferred embodiment of the invention includes a holder 6 made up of a cover latching and alignment portion 10 and stamped and formed recessed portion 7 shaped to receive an elastomeric wire guide (not shown), the recess including openings 8 and 9 for accommodating core receiving projections on the elastomeric wire guide in order to position an E-shaped lower magnetic core (not shown) of the type described in U.S. Pat. No. 5,241,219 relative to the base, the lower core being supported by a suspension (also not shown) to have one degree of freedom. Recessed portion 7 includes extensions 13 for receiving strain relief portions of the elastomeric guide and which extend into corresponding recesses (not shown) in base 1 in order to position holder 6, and consequently the resilient wire guide, relative to the base.

The quarter turn latch which fits within opening 10 and also within an opening 11 in cover 2 is conventional in nature and therefore not described in detail herein. However, it will be appreciated by those skilled in the art that numerous latching mechanisms other than a quarter turn latch may be substituted within the scope of the invention.

Like base 1, cover 2 supports a plurality of E-shaped cores, shown in FIG. 2 and designated by reference numerals 20 and 21. E-shaped cores 20 and 21 may optionally be resiliently supported, although such an additional resilient support will not ordinarily be necessary if the unique lower suspension described in U.S. Pat. No. 5,241,219 is used. E-cores 20 and 21 are secured to a thermoplastic member (not shown) which insulates the magnetic cores from the housing and from a metal shielding plate 23 forming a completely shielded enclosure for the transformer electronics housed therein.

A circuit board (not shown) provided in the enclosure formed by cover 2 and plate 23 carries a plurality of electrical components for transmitted signals to and from the core winding, including a read signal amplifier and a write signal driver circuit, both of which are completely shielded by the combination of metal plate 23 and cover 2. The windings are in the form of printed coils positioned on the circuit board to encircle openings in the circuit board through which the legs of the transformer cores extend. Read and write signals are preferably sent to and from the coupler via a conventional cylindrical connector (not shown) connected to the circuit board by wires (as opposed to the PCB tails described in U.S. Pat. No. 5,241,219). Finally, once metal plate 23 is in place, thereby completely shielding the read/write circuitry and coils, the upper housing unit thus formed may be potted using conventional potting methods and materials.

The end of cover 2 opposite latch opening 11 is secured to the base 1 by a latching member 30 having a distal latching projection 30a designed to engage an upper edge of slot 4 to hold the upper housing member in place. If latching member 30 is made of a resilient material, cover 2 can be snapped into base 1 in a single vertical motion, after the wires of a twisted pair or similar cable (not shown) have been untwisted and snapped into slots in the elastomeric wire guide described above. Projection 30a can also enter slot 4 via a horizontal motion parallel to the principal plane of the coupler.

The improved grounding arrangement of the preferred embodiment of the invention includes a conductive member 38 secured to base 1 by any suitable means and which is made up of a plurality of fingers 31 having wiping surfaces 32 to form a low impedance ground path between the fingers and a ground channel formed by a corresponding substantially planar conductive member 33 secured to cover 2 via screws or other suitable fasteners, and which includes two arms 34 which extend downwardly in the direction of assembly of the cover to the base, the exterior surfaces 35 of the conductive member 33 thereby slidingly engaging wiping surfaces 32 of fingers 31 when the cover 2 is assembled to the base 1. Preferably, fingers 31 are also provided in symmetrical fashion on side 36 of base 1 (the fingers on this side are obscured in FIG. 1 by the side of the base), and are offset to allow angled entry of conductive member 33 without causing deformation of the fingers. Also, grounding fingers 31 are preferably folded over base 1 to prevent hooking of the fingers by conductive member 33 cover.

As indicated above, previous coupler configurations incorporated relatively few points of electrical contact. The preferred arrangement, in contrast, embodies many points of electrical contact. Furthermore, unlike other coupler configurations of this type, the points of contact are wiping points of contact rather than butting points of contact. Many points of contact yield a lower impedance connection, and wiping points of contact yield a still lower impedance in that the contact points are maintained through the self-cleaning action of a wiping contact.

Having thus described a preferred embodiment of the invention, however, the inventors recognize that numerous variations of the preferred embodiment will undoubtedly occur to those skilled in the art, and intend that the invention be defined to include all such variations. For example, the conductive member 33 may be provided on base 1, and fingers 31 may be provided in cover 2. In addition, the arrangement of the conductive member and resilient fingers which make up the improved grounding arrangement may be affected by changes in the manner in which the base and cover are assembled together. Still further, the cable with which the coupler is to be used need not be an unshielded, twisted pair cable or a closed loop data bus. Consequently, it is intended that the invention not be limited to the preferred embodiment described herein and illustrated in the drawings but rather that it be limited solely by the appended claims.

We claim:

1. In a current-mode coupler of the type which includes at least one magnetic core structure made up of magnetic core structure parts situated in respective ones of two conductive casing halves, windings on the core structure, and associated circuitry, one of the casing halves being mounted on the other of the two casing halves to align the magnetic core structure parts and establish an inductive coupling between a data bus and the magnetic core structure, the improvement comprising:

a low impedance connection between the upper and lower casing halves made up of a conductive member on one of the casing halves to establish electrical continuity between the upper and lower casing halves, the conductive member including an extension in the direction in which the casing halves are assembled together, and a resilient member on the other of the two casing halves arranged to engage the extension of the conductive member when the casing halves are assembled together to establish a wiping contact between the conductive member and the resilient member.

2. A coupler as claimed in claim 1, wherein said conductive member is a conductive plate having arms extending in the direction of assembly, and said resilient member is one of a plurality of resilient fingers all arranged to wipingly engage said arms upon assembly of the casing halves to each other in order to establish a low impedance, multiple point of contact connection between said casing halves.

3. A coupler as claimed in claim 2, wherein one of said casing halves includes a cover and a shielding plate which together form a shielding enclosure for the windings and associated circuitry, and said conductive member is attached to said shielding plate.

4. A coupler as claimed in claim 1, wherein one of said casing halves includes a cover and a shielding plate which together form a shielding enclosure for the windings and associated circuitry, and said conductive member is attached to said shielding plate.

* * * * *

Disclaimer and Dedication

5,528,088 - David O. Gallusser, Oneonta; James B. LeBaron, Sidney, both of N.Y. CURRENT MODE COUPLER WITH IMPROVED GROUNDING. Patent dated June 18, 1996. Disclaimer and Dedication filed September 7, 1999, by the assignee Amphenol Corporation.

Hereby disclaims and dedicates to the Public claims 1-4 of said patent.
*(Official Gazette, November 16, 1999)*